United States Patent
Lvovskiy et al.

(10) Patent No.: US 7,412,999 B2
(45) Date of Patent: Aug. 19, 2008

(54) LABEL REMOVER

(76) Inventors: Matvey Zelmanovich Lvovskiy, 8750 Bay Pkwy., Apt #D5, Brooklyn, NY (US) 11214; Simon Iokhvidson, 8750 Bay Pkwy., Apt #A3, Brooklyn, NY (US) 11214

( * ) Notice: Subject to any disclaimer, the term of this patent is extended or adjusted under 35 U.S.C. 154(b) by 42 days.

(21) Appl. No.: 11/129,729

(22) Filed: May 16, 2005

(65) Prior Publication Data
US 2006/0254723 A1  Nov. 16, 2006

(51) Int. Cl.
B32B 38/10 (2006.01)
B24B 49/02 (2006.01)
B24B 7/00 (2006.01)

(52) U.S. Cl. .......... 156/584; 156/344; 451/9; 451/259; 451/457; 15/319

(58) Field of Classification Search ......... 451/259, 451/451, 457, 8, 9; 156/344, 584; 144/136.95, 144/154.5; 408/67, 137
See application file for complete search history.

(56) References Cited

U.S. PATENT DOCUMENTS

| | | | |
|---|---|---|---|
| 3,274,684 A | 9/1966 | Marks | |
| 3,657,812 A | 4/1972 | Lee | |
| 3,673,744 A * | 7/1972 | Oimoen | 451/353 |
| 3,701,221 A * | 10/1972 | Vinella | 451/353 |
| 3,946,750 A | 3/1976 | Fischer et al. | |
| 4,114,267 A | 9/1978 | Marchio et al. | |
| 4,135,334 A * | 1/1979 | Rudiger | 451/456 |
| 4,195,383 A * | 4/1980 | Leinfelt | 15/339 |
| 4,325,775 A | 4/1982 | Moeller | |
| 4,435,870 A * | 3/1984 | Tucker et al. | 15/98 |
| 4,514,874 A * | 5/1985 | Kurz | 15/339 |
| 4,742,652 A * | 5/1988 | Cannan et al. | 451/353 |
| 4,833,753 A * | 5/1989 | Muller | 15/339 |
| 5,152,865 A | 10/1992 | Hurst | |
| 5,163,252 A * | 11/1992 | Garner et al. | 451/451 |
| 5,442,851 A | 8/1995 | Lerner et al. | |
| 5,536,355 A | 7/1996 | Rowland | |
| 5,587,096 A | 12/1996 | Huvard et al. | |
| 5,679,210 A | 10/1997 | Thomas | |
| 5,879,504 A * | 3/1999 | Winter | 156/344 |
| 5,993,305 A * | 11/1999 | Chu | 451/357 |
| 6,027,399 A * | 2/2000 | Stewart | 451/353 |
| 6,158,493 A | 12/2000 | Hildebrand et al. | |
| 6,248,007 B1 * | 6/2001 | deBlois et al. | 451/344 |
| 6,896,604 B1 * | 5/2005 | Taylor et al. | 451/451 |
| 7,223,161 B2 * | 5/2007 | Kodani et al. | 451/354 |

* cited by examiner

Primary Examiner—Mark A Osele

(57) ABSTRACT

The present invention relates to a hand held label removal apparatus, which provides a safe and easy removal of otherwise hard to remove labels that are affixed to various types of containers such as carton packaging, plastic products and similar materials. The distinctive features of the device include high productivity, the ability to remove various parts of the label as well as the label in its entirety, is completely safe and ecologically harmless. The invention comprises of a flat grinding circlet or a face mill, which is put in a circular motion by an electric motor. The design of the invention ensures that the area of the label that is being processed is insulated from the outside environment and byproducts formulated as a result of the label removal process are evacuated by the vacuum method such as a standard vacuum cleaner hose connected to a vacuum cleaner.

2 Claims, 3 Drawing Sheets

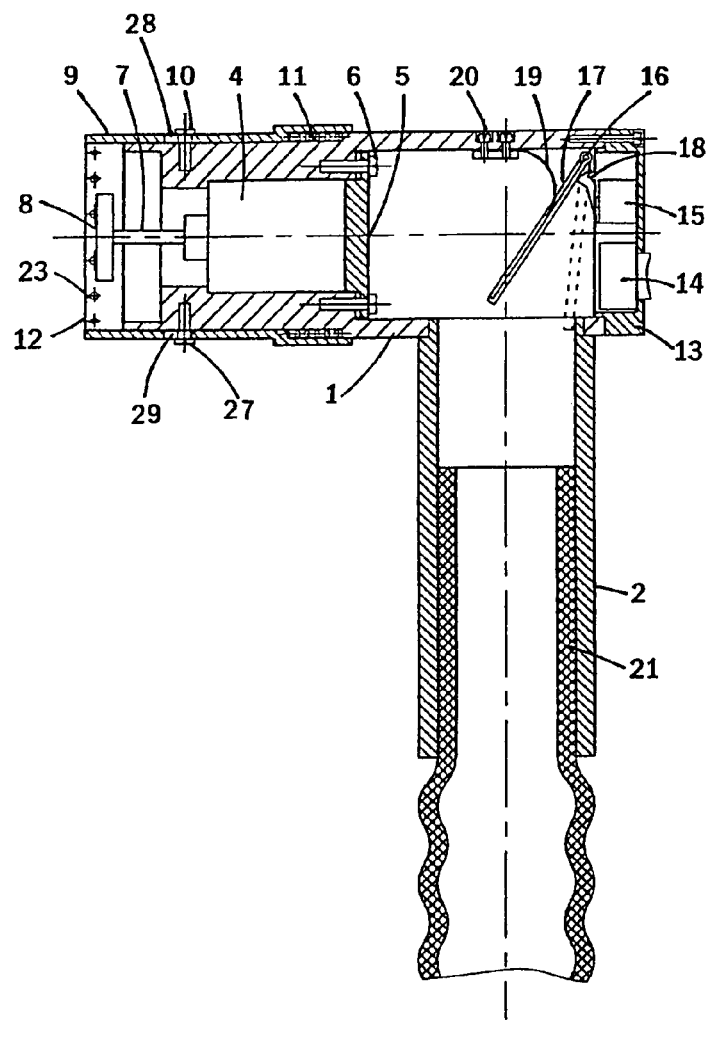 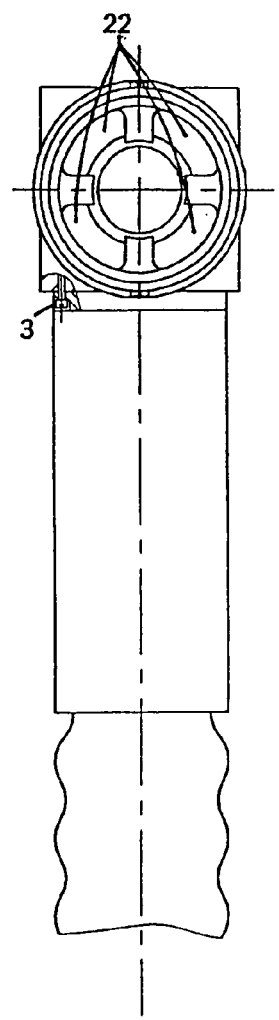
*FIG. 1A*   *FIG. 1B*

LABEL REMOVER

BACKGROUND OF THE INVENTION

The present invention Label Remover relates to devices that are used to remove labels that are affixed to various types of containers, all types of paper and carton folders and packages, plastic made products and various other materials.

The necessity for creation and usage of similar devices is derived from the fact that labels on shipping boxes, packages, and various types of folders carry certain sensitive and confidential information such as order numbers, customer and account numbers, asset tag numbers, addresses, telephone numbers and other proprietary information. In the hands of an identity thief, that information can be used with detrimental intent. Consistently escalating popularity of identity theft, fraud and other related crimes necessitate the creation of a device to easily and effectively remove information located on labels that are affixed to various types of objects. The proposed Label Remover provides safe and complete removal of labels from shipping materials, folders and other objects for purposes of security, reusability of materials, as well as removal for replacement of old labels with newer labels that carry updated information.

The patent search results revealed that numerous devices have already been patented, which attempt to solve these or similar problems. Those include U.S. Pat. Nos. 3,946,750; 4,114,267; 4,325,775; 4,599,131; 5,152,865; 5,536,355; 5,587,096; 5,679,210; and 6,158,493. The closest functional usage matches with regards to the present invention are U.S. Pat. Nos. 4,114,267; 5,679,210; and 6,158,393;

Device listed under U.S. Pat. No. 4,114,267 is used for removal of flat labels. The removal process is carried out fully via manual effort and with the use of a sharpened blade. This device exhibits the following shortcomings:

The practical usage of such device is labor consuming and requires significant manual effort resulting in definitive low productivity.

The process requires precise amounts of manual pressure to be exerted on the label's surface which is difficult to control by manual efforts. Applying more pressure then necessary is likely to cause damage to the processing surface area. Applying less pressure then necessary is likely to cause incomplete label removal.

U.S. Pat. No. 5,679,210 shows a manual finger actuated label removing apparatus. The device shares the manual approach with the above mentioned device, and delivers low levels of productivity due to the obvious limitations of a device that uses the human finger as leverage. As with previous device, this method does not provide safe label removal without causing probable damage to the surface area of the object, for instance a carton box which can otherwise be reused.

In device shown in U.S. Pat. No. 6,158,493, a handheld apparatus is designed to fully detach labels from objects such as a carton package. In actuality, paper labels do not detach equally and fully. The areas of the label that were exposed to slightly higher amounts of glue would require an adjusted balanced effort in order to be properly removed. The design of this device overlooks that very fact and as a result will fail to effectively detach the labels fully from the targeted surface. As with the previous devices, the process of fully detaching the label from the surface of an object is labor consuming, requires significant amounts of time and effort, and is generally impractical.

SUMMARY OF THE INVENTION

Accordingly, it is an object of the present invention to overcome these and other drawbacks and limitations inherent to prior art by providing a novel Label Remover for safe, easy, and effective removal of labels from various types of boxes, folders and other materials. In addition, the invention can be used for processing and polishing of wooden and plastic materials The device differentiates itself by providing high productivity, safe removal of the label in its entirety as well as its various parts, is completely safe, and ecologically harmless, providing unrestricted usage in offices and homes without the need for additional protective measures.

The essence of the invention consists of the unique design which provides removal of labels from relatively soft materials such as carton, and which is comprised of a cylindrical casing which holds electrical motor and a flat cutting instrument mounted on the motor's axis. The device is further comprised of a handle which is attached to the casing. In order to ensure effective isolation of the label processing area from the surrounding environment, as well as to provide limitations on maximum allowable cutting depth and to ensure safe operation, a movable cup is introduced into the design of the Label Remover. The cup is seated on the casing with a minimal accepted gap and also utilizes a spring which is positioned midway between the cup and the casing. To define limits of motion of the cup and the casing with respect to each other while manual pressure is applied to the handle, the cup is equipped with dual symmetrical longitudinal passageways of predefined width and length. Two limitation screws are inserted inside apertures located in corresponding places inside the casing. This design provides limitation on maximum depth of the processing area which makes it equal to the thickness of the label. Following the initial placement of the circular edge of the cup to the area identified for removal and applying some manual pressure to the handle directed along the axis of the electrical motor, the rotating cutting element comes into initial contact with the surface of the material and continues to penetrate the surface until the limitation screws are pressed firmly against the limits of the cup's passageways. The travel distance between the circular edge of the cup (in initial contact with the surface) and the cutting element contacting the surface corresponds to the thickness of a given label. While in the latter operational state, moving the label remover in any direction effectively removes all or a certain part of the label. While in non-operational state, the cup is placed under the force of the spring which pulls the cup into its original state and the cutting instrument is concealed inside the cup. The introduction of air apertures and passageways traveling through bottom portion of the cup and through the casing, and the handle constructed to be connected to a hose of a vacuum cleaner makes it possible for immediate removal of debris and other byproducts formed as a result of the label removing process. In addition, the electrical layout of the Label Remover is constructed in a way which allows the activation of the device only after proper connectivity to the vacuum source is established. Upon disconnection of the vacuum source from the Label Remover, the device immediately shuts off by so eliminating the possibility of accidental contamination of the surrounding environment with debris. This is accomplished with the introduction of a movable membrane located inside the casing and which is positioned to be under direct influence of the airflow and when under the pressure of the airflow will deviate from its initial position by so activating the micro switch which in turn activates the label remover. The disengagement of the vacuum cleaner provides no airflow pressure to the membrane subsequently returning the membrane into the neutral/initial position by so deactivating the Remover.

BRIEF DESCRIPTION OF THE DRAWINGS

A more complete appreciation of the subject matter of the present invention and the various advantages thereof can be realized by reference to the following detailed description in which references are made to the accompanying drawings in which:

FIG. 1A and FIG. 1B is a functional diagram of the Label Remover with frontal and side views;

DETAILED DESCRIPTION OF THE PREFERRED EMBODIMENT OF THE INVENTION

Figure 2:
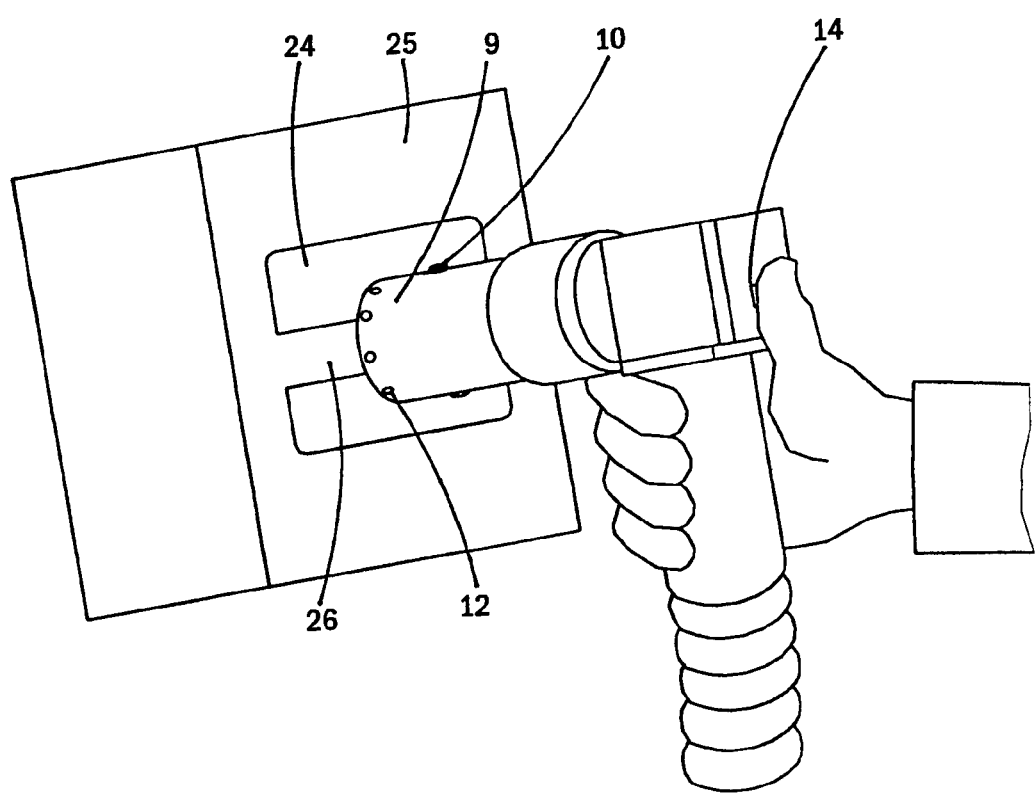
FIG. 2 shows external operative view of the Label Remover on a label affixed to a surface of an object.

A detailed description of the present invention follows with reference to accompanying drawings in which like elements are indicated by like reference letters and numerals.

The Label Remover shown on FIG. 1A consists of two parts—casing 1 and handle 2, fastened together by screws 3. With the help of handle 2, the Label Remover is initially positioned to travel within the area of the label being processed.

The left side of cylindrically shaped casing 1 holds an electric motor 4, frontal side of which leans on the ledges of the casing, and from the opposite side mounts with rods 5, and screws 6. On the shaft 7 of the electric motor 4, a cutting instrument 8 is attached which consists of an abrasive circle or a frontal face mill. As such, the cutting plane of the instrument 8 must be placed at a fixed distance from the front face of the cylindrical portion of casing 1.

Figure 3B:
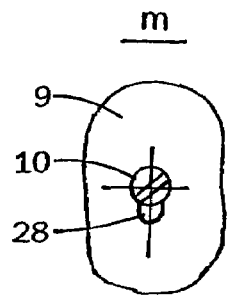
FIGS. 3A and 3B show the position of the cutting instrument in a non-operational state.
Figure 3A:
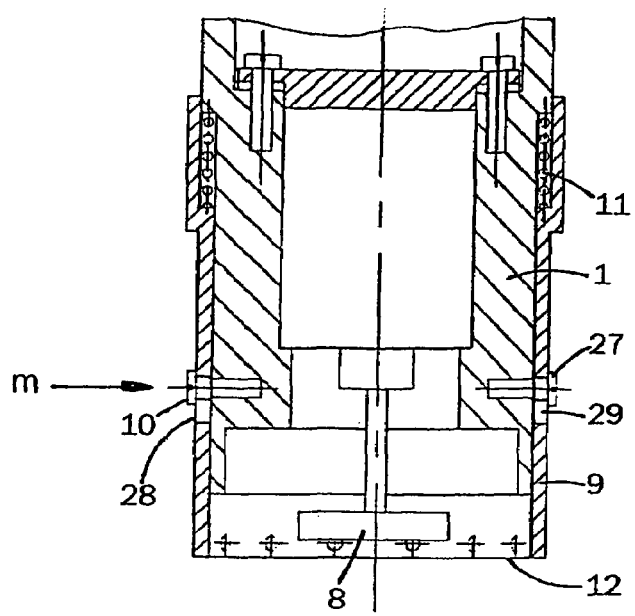
Figure 4B:
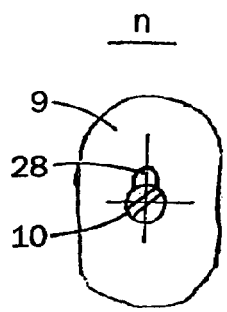
FIGS. 4A and 4B show the position of the cutting instrument in an operational state

On the exterior of casing 1, with a minimal allowed gap, a cylindrical cup 9 is placed and mounted on the casing with 2 limitation screws 10 and 27 positioned in the longitudinal passageways 28 and 29 with the cup depressed from the edges of the casing via constant pressure from spring 11. The length and the location of the longitudinal passageways 28 and 29 inside the cup 9 for screws 10 and 27, as well as the location of the apertures inside case 1 for screws 10 and 27 (FIGS. 3A and 3B) allows the cup 9 under the influence of spring 11, assume the position in which the flat cutting edge of the instrument 8 is concealed inside the cup on predefined distance from the external face 12. This ensures safety with respect to the handling of the Label Remover in a non-powered state as well as in a powered non-operational state The distance of the longitudinal passageways 28 and 29 (FIGS. 4A and 4B) ensures that when manual pressure is applied to the handle, the exposure distance of the cutting instrument 8 over the external face 12 of the cup 9 is equal to the thickness of the label 24 or another predefined distance.

Inside the right part of Casing 1, a rectangular shaped cover 13 is installed. Mounted on the cover 13, are switch 14 and micro switch 15 that are serially connected to an electric motor 4. That layout ensures that the Label Remover will only activate when switch 14 and micro switch 15 are in the ON positions.

Inside the crater of casing 1 on axis 16, a membrane 17 is positioned having hard sides on the perimeter. The Membrane 17 is balanced from one side with a spring actuated trigger and from another, with a spring 19 which is mounted on the inner side of casing 1 with screws 20.

Internal design of the lower handle 2, is constructed in a way which allows for insertion inside it a vacuum hose tip 21, for immediate byproduct removal.

To ensure proper airflow inside casing 1, the Label Remover is equipped with dual side grooves 22 (FIG. 1B). Outside air that is required to enter the Label Remover blows in through apertures 23 located near the external face 12 of the cylindrical cup 9. The air flowing through apertures 23 as well as through the electric motor also creates a cooling effect on the motor, which is particularly important with respect to prolonged usage of the invention.

Switch 14 is used for manual activation of the Label Remover, although activation may also be achieved automatically. In the event of automatic activation, the functions of switch 14 are carried out by a micro switch (not shown on FIG. 1A), which is mounted on casing 1 and is activated by movement of the cylindrical cup 9, towards the compression of spring 11.

The choice of the power supply would depend on the type of the electric motor used. The preference is given to the electrical motor, operating from a standard electrical circuit, for instance 120V, 60 Hz. The electric motor with decreasing electrical load, increases the current flow commutated by the micro switch. This requires escalated parameter requirements for the micro switch.

Before activation in home and office environments, the Label Remover should be attached to the vacuum cleaner with a vacuum hose by inserting one end of the vacuum hose inside the conic aperture 21 located at the bottom of the handle. The other end of the vacuum hose will be connected to the vacuum cleaner. With concurrent usage of a number of Label Removers for instance on a mass production and large factories, the use of a centralized vacuum source which is powered from a single powerful compressor is recommended.

With the activation of the vacuum cleaner, the airflow creates an additional pressure on membrane 17. Under the airflow pressure, the membrane goes into motion and causes the activation of the micro switch 15. This allows for the activation of the Label Remover with switch 14. Micro switch 15 is an important electrical current blocking element which eliminates the possibility of accidental operation of the Label Remover without prior connectivity to a vacuum source. This prevents accidental dispersion of paper particles and other byproducts which may form during the label removing process into air and subsequently inside human lungs.

Figure 4A:
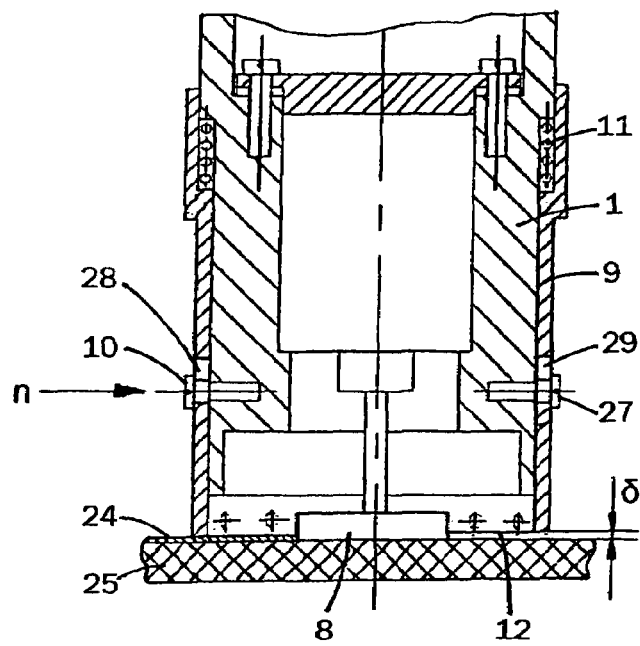

For proper operation of the Label Remover, it is necessary to press the button of the switch 14 (see FIG. 2). For removal of area 26 of label 24, affixed to an Object 25, one has to position the cutting instrument on the given area, press the external face 12 towards the label area identified for removal and apply slight pressure towards the axis of the cylindrical cup 9, overcoming the pressure of spring 11 (FIG. 1A, FIG. 4A, position 30).

The cutting element of the cutting instrument 8 will come into contact with the processing area of the relatively soft material such as carton and remove the label from its surface. By shifting the Label Remover in various directions, one will effectively remove the entire label in a few seconds.

The shifting of the cylindrical cup 9 is limited by screws 10 and 27, which also limit the height of the exposed area of the cutting instrument 8, and subsequently the depth of the removable area. The specified height of the exposure corresponds to the approximate height of the label. This minimizes and/or fully eliminates the damage to the surface of an object to which the label is affixed, allowing for instant reusability of objects such as shipping and packing boxes. Dust and small particles which may form throughout the removal process from paper, carton, wrappings, and plastics are immediately sucked into the vacuum cleaner ensuring complete and instantaneous removal from the surface of the working area thus preventing the dispersion into the surrounding environment.

The suggested Label Remover has the following significant advantages over the devices identified in U.S. Pat. Nos. 4,114,267; 5,679,210; 6,158,393:

Possesses high levels of productivity with low probability of damage that can otherwise be caused to the surface of the material to which the label is affixed such as carton packaging.

Utilizes ecologically harmless removal technology, which eliminates the possibility of byproducts dissemination into air, thus preventing health hazards.

Feasible for usage in home and office environments, large storages, warehouses and factories.

Easy to use and minimizes the amount of manual effort associated with the label removal process.

Can be used with a large number of standardized vacuum cleaners

Equipped with a system disallowing usage prior to connecting to a vacuum source by so eliminating the possibility of accidental contamination of the surrounding environment

We claim:

1. A Label Remover designed for the purposes of removing labels from the surface of objects made from relatively soft materials such as carton boxes and possessing the functionality of immediate byproduct removal utilizing a standardized vacuum cleaner and distinguished by: providing hazard free and environmentally safe operation by incorporating a blocking mechanism eliminating accidental byproduct dispersion into the outside environment via accidental activation of the device without prior connectivity to a vacuum source and comprising of: a membrane mounted on the casing's inside at an angle, a cut-off switch with a spring lever internally mounted on the upper portion of the casing and that is sequentially connected with the electric motor, whereas one side of the membrane makes contact with the spring lever; whereas upon activation of a vacuum source the membrane under the pressure of passing airflow comes into motion and presses with its side on the spring lever by so deactivating the cut-off switch subsequently closing the electric circuit and activating the device.

2. A Label Remover as in claim 1, distinguished by whereas in order to provide sufficient balance of the membrane by so increasing dependability of correct deactivation of the cut-off switch via passing airflow, the label remover is further equipped with a counter balance spring with its lesser force directed towards the spring lever.

* * * * *